(12) United States Patent
Lemchen

(10) Patent No.: US 8,695,152 B2
(45) Date of Patent: Apr. 15, 2014

(54) APPARATUS FOR CLEANING A TOUCH OR DISPLAY SCREEN

(76) Inventor: Marc Lemchen, New York, NY (US)

(*) Notice: Subject to any disclaimer, the term of this patent is extended or adjusted under 35 U.S.C. 154(b) by 760 days.

(21) Appl. No.: 12/893,956

(22) Filed: Sep. 29, 2010

(65) Prior Publication Data

US 2011/0284025 A1 Nov. 24, 2011

Related U.S. Application Data

(60) Provisional application No. 61/346,814, filed on May 20, 2010.

(51) Int. Cl.
*H04M 1/17* (2006.01)
*H04M 1/21* (2006.01)

(52) U.S. Cl.
USPC ............... 15/250.29; 455/90.3; 455/575.1; 15/250.001; 15/246; 361/679.02; 361/679.56

(58) Field of Classification Search
USPC ............ 15/246, 250.001, 250.29, 250.04, 15/250.03, 250.11, 250.4, 250.41, 250.3; 455/899, 90.1–90.3, 550.1, 455/575.1–575.4; 224/576, 929; 361/437, 361/679.55, 679.56, 679.01–679.07; 220/345.1–345.6
See application file for complete search history.

(56) References Cited

U.S. PATENT DOCUMENTS

| | | | |
|---|---|---|---|
| 1,232,815 A | 3/1917 | Lapedes | |
| 2,740,151 A | 4/1956 | Wayne | |
| 3,158,935 A * | 12/1964 | Rosenthal | ..................... 433/30 |
| 4,257,138 A | 3/1981 | Clements | |
| 4,457,597 A * | 7/1984 | DeGideo | .................. 15/250.003 |
| 5,070,571 A * | 12/1991 | Arai | ......................... 15/250.001 |
| 5,216,776 A | 6/1993 | Dennison | |
| 5,957,700 A | 9/1999 | Ariyama | |
| D433,237 S | 11/2000 | Katz | |
| 6,182,320 B1 | 2/2001 | Kruger | |
| 6,370,720 B1 | 4/2002 | Jang | |
| 6,687,938 B1 | 2/2004 | Harmon | |
| 6,766,553 B2 * | 7/2004 | Wilson | ...................... 15/250.04 |
| 6,944,904 B1 | 9/2005 | Williams | |
| 6,948,210 B1 | 9/2005 | Shah | |
| 7,231,683 B1 | 6/2007 | Cruz | |
| D547,911 S | 7/2007 | Subotic | |

(Continued)

FOREIGN PATENT DOCUMENTS

DE 2700527 * 9/1978
JP 2003-298708 * 10/2003

(Continued)

*Primary Examiner* — Gary Graham
(74) *Attorney, Agent, or Firm* — Marcus C. Dawes; Daniel L. Dawes

(57) ABSTRACT

An apparatus for cleaning the touch or display touch or display surface of an electronic device such as a cell phone or computer tablet comprising a wiper coupled to cleaner bar. The cleaner bar moves longitudinally and/or laterally across the electronic device with the wiper in contact with the touch or display surface. The wiper comprises both a moist pad and a dry pad. The moist pad is fluidly communicated to a reservoir defined within the cleaner bar. On its "cleaning stroke", cleaning fluid is released into the moist pad and then deposited onto the touch or display surface. The cleaner bar moves longitudinally across the touch or display surface by manual or motorized means. The cleaner bar may also be in communication with the electronic device to detect when a task has been completed on the electronic device. After detection, the cleaner bar automatically traverses the touch or display surface, thereby cleaning it after every use.

11 Claims, 19 Drawing Sheets

(56) References Cited

U.S. PATENT DOCUMENTS

| | | |
|---|---|---|
| 7,503,091 B2 | 3/2009 | White, Jr. |
| 7,574,769 B1 | 8/2009 | Nemeth |
| 7,801,576 B2 * | 9/2010 | Fagrenius et al. ......... 455/575.1 |
| 2008/0160494 A1 | 7/2008 | Leifer |
| 2009/0051666 A1 | 2/2009 | Choi |
| 2009/0201265 A1 | 8/2009 | Mockett |
| 2011/0290841 A1 * | 12/2011 | Philippe ....................... 224/576 |
| 2013/0118933 A1 * | 5/2013 | Wang et al. ................... 206/320 |

FOREIGN PATENT DOCUMENTS

| | | | |
|---|---|---|---|
| JP | 2004-312143 | * | 11/2004 |
| JP | 2005-204140 | * | 7/2005 |
| JP | 2006-30247 | * | 2/2006 |

* cited by examiner

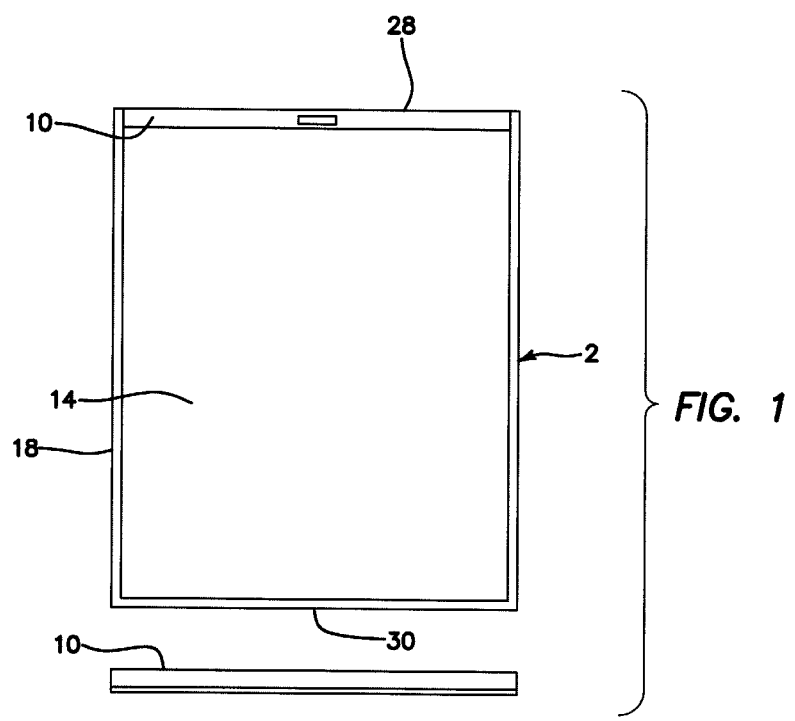
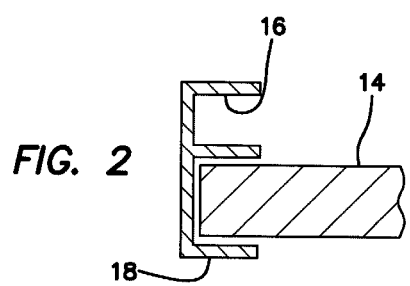

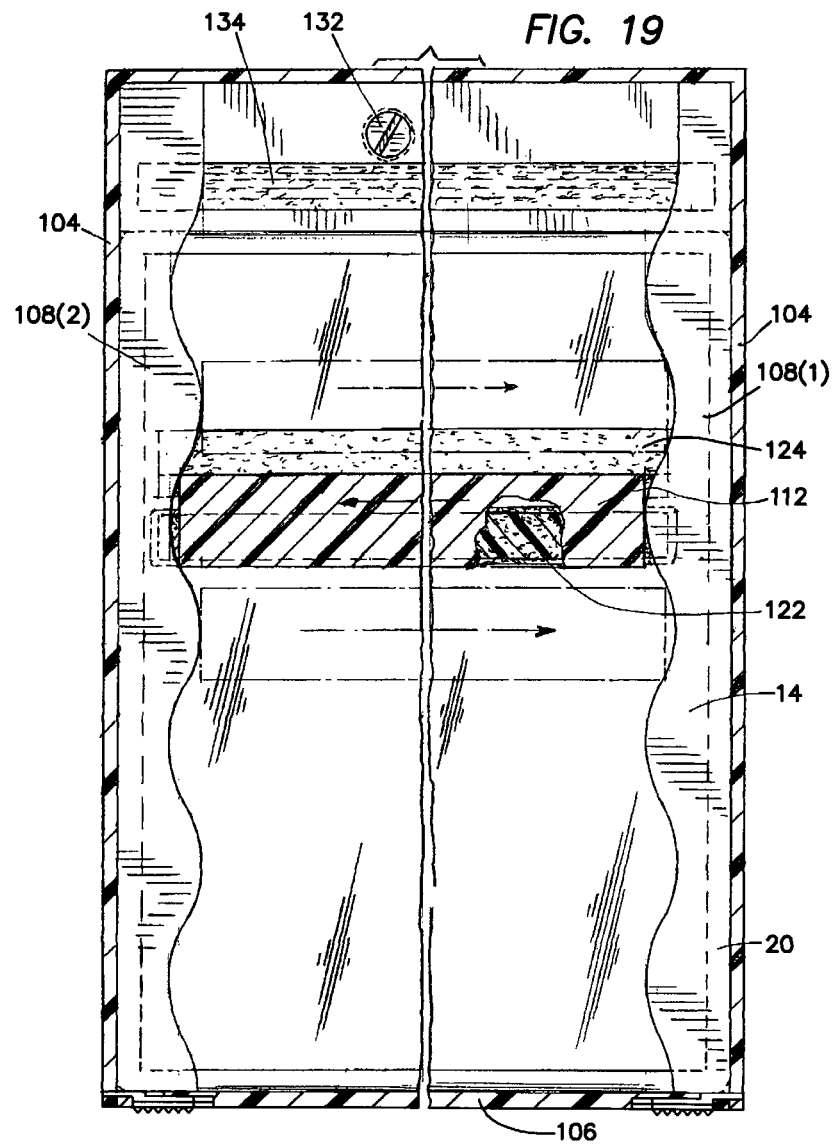

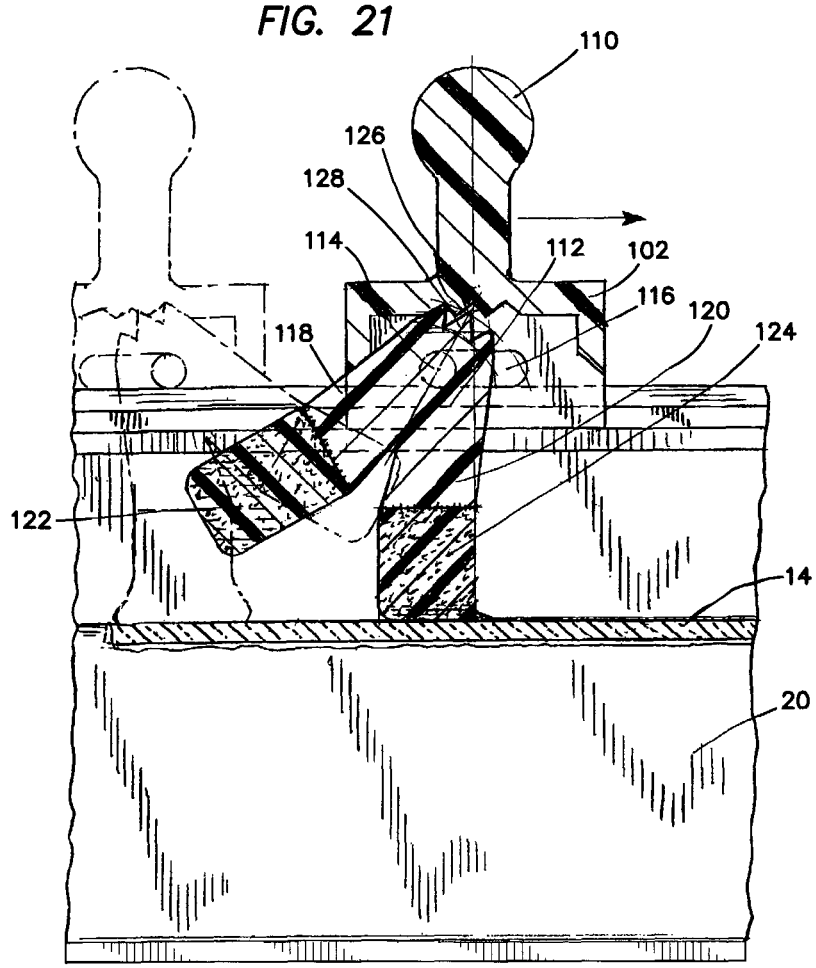

APPARATUS FOR CLEANING A TOUCH OR DISPLAY SCREEN

RELATED APPLICATIONS

The present application is related to U.S. Provisional Patent Application Ser. No. 61/346,814, filed on May 20, 2010, which is incorporated herein by reference and to which priority is claimed pursuant to 35 USC 119.

BACKGROUND OF THE INVENTION

1. Field of the Invention

The invention relates to the field of screen cleaners, specifically screen cleaners for personal electronics such as computer tablets or cell phones.

2. Description of the Prior Art

Recently, the use of touch screens in modern culture has dramatically increased with the introduction of touch screen cell phones, computer tablets, and navigational devices to name a few. Touch screens are not just exclusive to personal electronics, but are also commonly used on many devices frequented by large amounts of the general public such as ATMs, public transportation ticket vendors, and the like. With all touch screen devices, finger prints are an issue no matter the particular application in which they are used for. The output display, which also serves as the input "keyboard" soon becomes smudged or smeared with dirt, oil, grease or grime, making its use less desirable. The screens can also become unsanitary, particularly if used by a number of people, for example in a medical office or hospital for data entry by patients or staff.

There are a variety of screen cleaning apparatus specifically designed for cleaning a display or touch screen. Principally among these are screen cleaners that are manually moved along a track that push or pull a wiper across the screen. These screen cleaners may either be a separate standalone item or be permanently or temporarily coupled to the screen it is to clean. A sanitizer fluid may also be applied by the wiping means and then left to evaporate from the screen.

While these particular pieces of art are not without their particular successes, they are not without their faults either. The prior art methods of cleaning a touch or display screen do not involve any sort of drying other than natural evaporation. Evaporation can leave water marks or other spots on the screen which may require further cleaning. Additionally, many wiper mechanisms found in previous screen cleaning apparatuses do not have the capability of reaching the entire surface area of the touch screen effectively. What is needed is a method and apparatus for cleaning the entire surface of a touch or display screen that comprises an easy to use wiper mechanism with a means for drying the screen once it has been cleaned so as to prevent unwanted residue left behind by a cleaner or sanitizer fluid.

BRIEF SUMMARY OF THE INVENTION

The current invention is an apparatus for cleaning a touch or display surface of an electronic device including a case disposed around an outer circumference of the electronic device, the case having two opposing edges. A track is defined on or within the two opposing edges of the case. A movable cleaner bar is disposed across a portion of the touch or display surface of the electronic device and is disposed within the track of the two opposing edges of the case. The cleaner bar includes a wiper which in contact with the touch or display surface.

In one embodiment, the wiper comprises a moist pad and a dry pad with the moist pad being coupled to the cleaner bar adjacent to the dry pad which is also coupled to the cleaner bar. The moist pad and dry pad are sufficiently shaped so as to permit only the moist pad to contact the touch or display surface as the cleaner bar is moved in a first direction, and to permit only the dry pad to contact the touch or display surface as the cleaner bar is being moved in a second direction opposite to that of the first direction.

The wiper is coupled to the cleaner bar by means of a plurality of male pegs disposed on the wiper that are inserted into a corresponding plurality of female apertures defined in the cleaner bar. The female apertures are sized to prevent any movement of the male pegs in one direction but allow free movement in a direction orthogonal to the one direction.

In one particular embodiment, the track defined within the two opposing edges of the case is curved or waved shaped along its length.

In a separate embodiment the apparatus includes a microcontroller, a plurality of batteries and an electric motor, both connected to the microcontroller within the cleaner bar. An axle is connected to the electric motor with a wheel connected to its far end of the axle, the wheel being disposed within the track defined within an edge of the case. When activated, the electric motor drives the wheel in either a clockwise and counterclockwise direction within the track.

The cleaner bar also contains a reservoir defined that is fluidly communicated to the wiper in contact with the touch or display surface.

In another embodiment, the reservoir is fluidly communicated to a nozzle that is disposed on the outside surface of the cleaner bar. In this embodiment, the cleaner bar is comprised of a resilient, easily deformable material so that when squeezed, cleaning fluid may exit the reservoir through the nozzle.

In yet another embodiment, the cleaner bar includes a USB port and a non-volatile memory chip coupled to the microcontroller. The non-volatile memory chip includes a software routine for detecting when a task has been completed on the electronic device. Once a task has been detecting as being completed on the electronic device; the microcontroller activates the electric motor and thus begins the movement of the cleaner bar and wiper.

In still another embodiment, the cleaner bar includes a vibrating motor disposed within the cleaner bar.

The current invention also contains an apparatus for cleaning the touch or display surface of an electronic device including a removable cleaner bar and a wiper coupled to the cleaner bar, wherein the wiper is connected to the cleaner bar by means of a plurality of male pegs disposed on the wiper that are inserted into a corresponding plurality of female apertures defined in the cleaner bar. The female apertures of the cleaner bar are sized to prevent any movement of the male pegs in a longitudinal direction but allow free movement of the male pegs in a lateral direction which is orthogonal to the longitudinal direction. The cleaner bar is in turn connected to a frame which includes a pair of apertures that are shaped to accommodate the electronic device being slid into the frame from either direction.

In one embodiment, the cleaner bar is connected to a removable sheath which is arranged and configured to accommodate the entirety of the electronic device. The sheath includes an opening for the insertion or removal of the electronic device from underneath the sheath.

Finally, the current invention also includes a method for cleaning the touch or display surface of an electronic device which involves moving a wiper coupled to a cleaner bar across the touch or display surface in a first direction, the wiper contacting the touch or display surface with a moist pad. Next the cleaner bar applies a cleaning fluid or disinfectant to the touch or display surface with the moist pad. The wiper is then moved across the touch or display surface in a direction reverse to the first direction, however this time only a dry pad disposed within the wiper contacts the touch or display surface.

In another embodiment, the wiper is moved across the touch or display surface in a second direction contemporaneously with moving the wiper in the first direction across the touch or display surface.

In still another embodiment, the wiper connected to the cleaner bar is moved in the first direction across the touch or display surface by motorized means.

In another embodiment, the method also includes completing a task on the electronic device in which the cleaner bar is connected to which is detected by the cleaner bar. In response, the wiper is automatically moved in the first direction across the touch or display surface by motorized means in response to the completion of the cleaning task on the electronic device.

In a final embodiment, the method further includes vibrating the wiper coupled to the cleaner bar contemporaneously with moving the wiper in the first direction across the touch or display surface.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 1 is a top plan view of the current cleaner bar comprising a case surrounding the screen of an electronic apparatus that is to be cleaned. In this embodiment the cleaner bar is permanently coupled to the case.

FIG. 2 is an end view of the cleaner bar seen in FIG. 1 with a magnified cross sectional view depicting the configuration between the case and the electronic apparatus, including the internal track that is defined within the case.

FIG. 10b is a schematic diagram of the electronic components contained within the cleaner bar seen in FIG. 10a.

FIG. 19 is a cross sectional view taken through line 5-5 of the alternative embodiment seen in FIG. 18.

FIG. 21 is a side cross sectional view of the alternative embodiment seen in FIG. 15, the squeegee beam applying a dry sponge to the surface of the electronic apparatus.

Figure 3A:
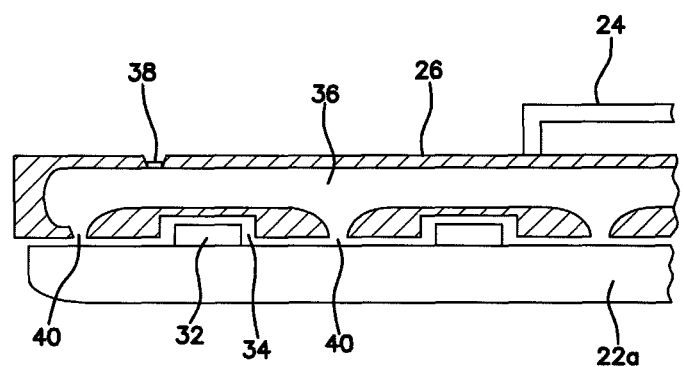
FIG. 3a is a magnified cross sectional view of a portion of the cleaner bar seen in FIG. 1 including a guide member and wiper member. In this embodiment, a reservoir is defined within the guide member and fluidly coupled to the wiper member.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

What is disclosed is a method and apparatus for cleaning the touch or display screen of a personal electronics device. In one embodiment, the apparatus comprises a case 2 comprising a built-in or integrally coupled screen cleaner bar 10 for an electronic apparatus 20 such as a personal computer tablet device, cell phone, navigational device, or any other similar personal electronic device now known or later devised comprising a touch or display screen 14 as shown in FIG. 1. The case 2 is preferably comprised of molded plastic or shock absorbent rubber and is disposed around the perimeter of the screen 14 of the electronic apparatus 20. The case 2 also comprises a top edge 28, a bottom edge 30, and at least two lateral edges 18 comprising an internal track 16 as seen in FIG. 2 and described in further detail below.

Figure 4:
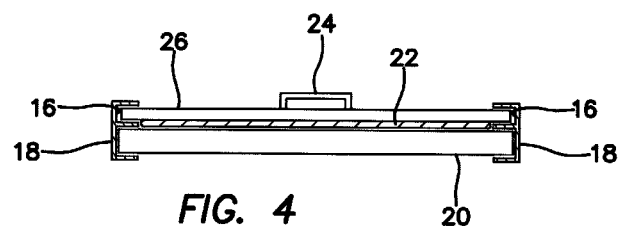
FIG. 4 is an end view of the cleaner bar seen in FIG. 1 disposed within the internal track of the case with an electronic apparatus also disposed within the case.
Figure 5:
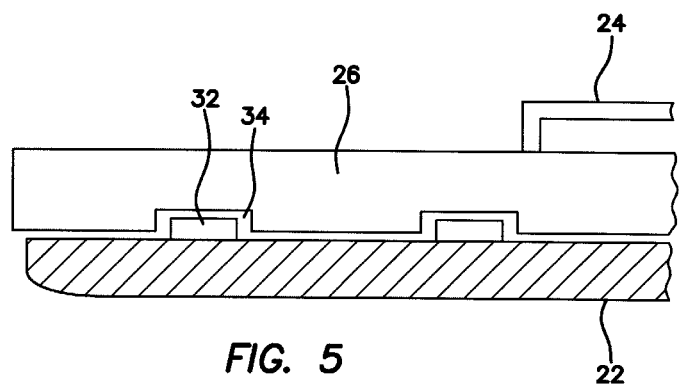
FIG. 5 is a magnified view of the coupling between the guide member and the wiper member of cleaner bar seen in FIG. 1.

The cleaner bar 10 comprises a guide member 26 and a wiper member 22 as seen in FIG. 4. The guide member 26 is sufficiently long enough reach across the width of the touch screen 14 with each end disposed within the track 16 of each lateral edge 18 of the case 2. The guide member 26 also comprises a handle 24 on its top surface. Coupled to the guide member 26 is the wiper member 22 which itself comprises a moist pad 22a and a dry pad 22b. Both the moist pad 22a and dry pad 22b are preferably comprised of absorbent microfibers, however other materials suitable for the delicate cleaning of electronics now known or later devised may also be used within the original scope of the invention. The wiper member 22 also comprises a plurality of male pegs 32 coupled to its top surface which are disposed within a corresponding plurality of female apertures 34 defined within the guide member 26. The female apertures 34 are sufficiently sized and shaped to accommodate and capture the depth of the male pegs 32, but comprise a longer lateral length than the male pegs 32 as best seen in FIG. 5. In other words, the male pegs 32 may not move forwards or backwards within the guide member 26, but are free to move side to side or laterally left and right within the female apertures 34.

Figure 6A:
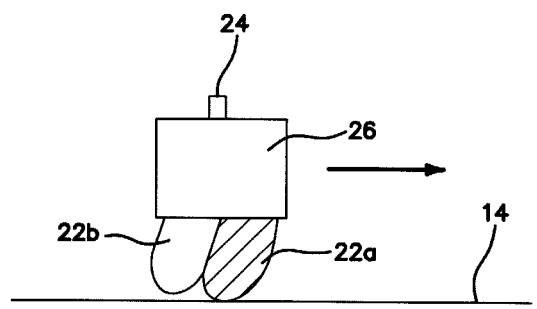
FIG. 6a is a side view of the cleaner bar seen in FIG. 1 moving longitudinally across the screen surface of the electronic apparatus, the wiper member applying a "cleaning" stroke to the screen surface.
Figure 6B:
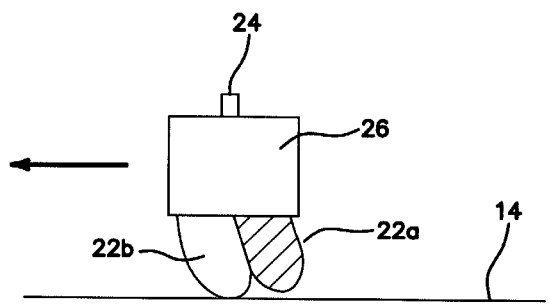
FIG. 6b is a side view of the cleaner bar seen in FIG. 1 moving longitudinally across the screen surface of the electronic apparatus, the wiper member applying a "drying" stroke to the screen surface.

In one particular embodiment, the cleaner bar 10 may be moved across the screen 14 manually by a user gripping the handle 24 and pulling the cleaner bar 10 from the top edge 28 of the case 2 down towards the bottom edge 30 of the case 2. As the cleaner bar 10 moves, the guide member 26 is pulled through the tracks 16 within either lateral edge 18 which helps to keep the wiper portion 22 on a desired portion of the surface of the screen 14. As the wiper portion 22 is being pulled across the screen surface 14, the moist pad 22a which is disposed on the "right" side of the cleaner bar 10 as seen in FIG. 6a, makes contact with the screen 14 and releases a standard cleaning fluid or disinfectant as is known in the art that is contained within the absorbent moist pad 22a. During its traversal down the screen 14, only the moist pad 22a makes contact while the dry pad 22b remains just slightly out of contact of the screen 14 due to the deformed shape of the moist pad 22a as it moves across the screen 14. The cleaner bar 10 is continually moved down the surface of the screen 14 for as long as the user desires or until contact is made with the bottom edge 30 of the case 2. The process of the cleaner bar 10 moving down the electronic apparatus 20 with the moist pad 22a in contact with the screen surface 14 is known as the "cleaning stroke."

When the cleaner bar 10 has reached its end point, the user reverses the direction of movement of the cleaner bar 10 by pushing up on the handle 24, thereby sending the guide member 26 back through the tracks 16 in either lateral edge 18 in the direction from which it came. As the wiper member 22 moves back up the surface of the screen 14, the dry pad 22b makes contact along the same path as the moist pad 22a in reverse and removes the cleaning fluid or disinfectant deposited by the moist pad 22a before it. During its traversal up the screen 14, only the dry pad 22b makes contact while the moist pad 22a remains just slightly out of contact of the screen 14 due to the deformed shape of the dry pad 22b as it moves across the screen 14. It is this fashion that dirt or oil from the fingerprints of multiple users of the electronic apparatus 20 are removed. The wiper member 22 can further be moved slightly side to side by moving the guide member 26 side to side as it moves up and down the screen 14 to provide more of a rubbing motion as is needed. The process of the cleaner bar 10 moving up the electronic apparatus 20 with the dry pad 22b in contact with the screen surface 14 is known as the "drying stroke." Using this technique the screen 14 is typically cleaned in 2 seconds or less.

In one embodiment, the cleaning fluid or disinfectant is supplied to the moist pad 22a of the wiper member 22 by a reservoir 36 that is fluidly communicated with the moist pad 22a as seen in FIG. 3a. The reservoir 36 is defined within the guide member 26 and comprises a plurality of tapered outlets 40 throughout the length of the guide member 26. The tapered outlets 40 are sufficiently sized and shaped to allow the cleaning fluid or disinfectant contained within the reservoir 36 to slowly drip out of the guide member 26 on to the moist pad 22a disposed beneath it over a sustained period of time. The reservoir 36 may be refilled by means of a one-way valve 38 defined within the guide member 26 as is known in the art.

Figure 3B:
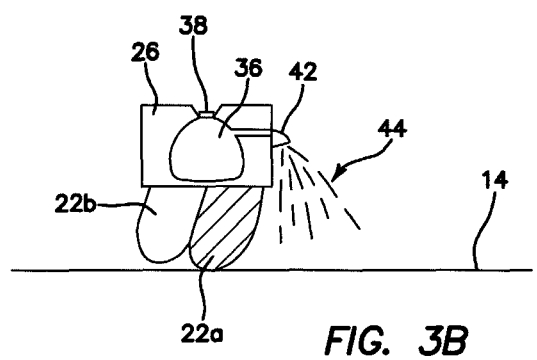
FIG. 3b is a side cross sectional view of the cleaner bar seen in FIG. 1 comprising a squeezable reservoir defined within a guide member and further comprising a spray nozzle disposed on the front face of the guide member.

In another embodiment, the reservoir 36 is fluidly communicated to a spray nozzle 42 disposed on the guide member 26 above the moist pad 22a. In this embodiment, the guide member 26 is comprised of soft flexible plastic, rubber, or other easily deformable material that is easily compressed when squeezed by the hand of a user. When the guide member 26 is squeezed, the reservoir 36 is in turn squeezed which pushes the cleaning fluid out of the spray nozzle 42. The spray nozzle 42 then disperses the cleaning fluid onto the surface of the screen 14 through a fine mist 44 in front of the oncoming moist pad 22a as seen in FIG. 3b. The cleaning fluid may be applied to the screen surface 14 before the moist pad 22a is pulled down the tracks 16 or contemporaneously with the cleaning stroke as discussed above.

Figure 8A:
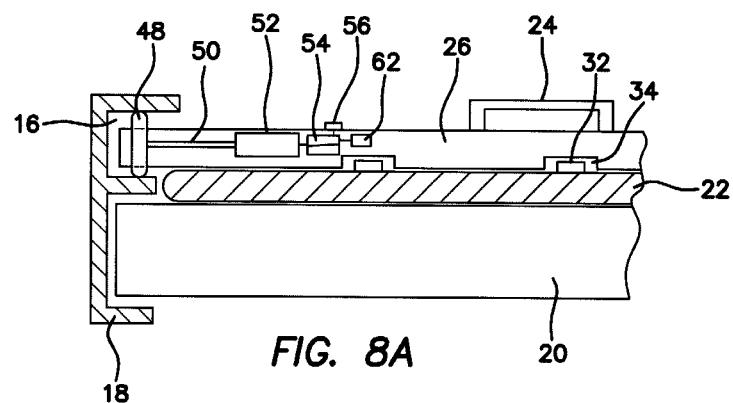
FIG. 8a is an end cross sectional view of an alternative embodiment of the cleaner bar comprising a means for motorized movement comprising an electric motor, axle, and wheel.
Figure 8B:
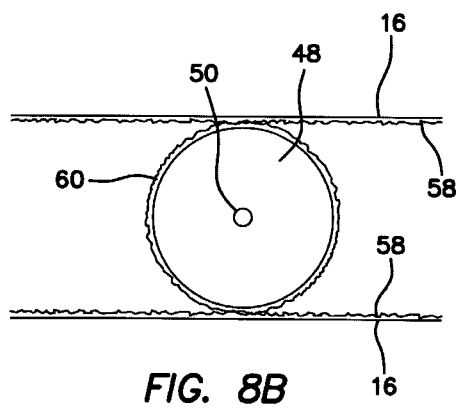
FIG. 8b is a magnified end view of the wheel component of the embodiment seen in FIG. 8a disposed within the internal track of the case seen in FIG. 2. The rough surfaces of the internal track and wheel are exaggerated for purposes of understanding.

In another embodiment, the cleaner bar 10 is motorized or otherwise electrically powered. In this embodiment the guide member 26 of the cleaner bar 10 comprises a small electric motor 52 powered by a plurality of lithium coin type batteries 54 as is known in the art. The electric motor 52 drives an axle 50 that is coupled to a wheel 48 at its distal end. A second electric motor 52, axle 50, and wheel 48 may be disposed at the opposing end of the guide member 26 in a mirror image to that seen in FIG. 8*a*, or alternatively the same electric motor 52 seen in FIG. 8*a* may be used to drive a plurality of wheels 48 disposed at both lateral ends of the guide member 26. When the user presses a power button 56 disposed on the outside of the guide member 26 as seen in FIG. 8*a*, the electric motor 52 activates and begins rotating the axle 50 which in turn rotates the wheel 48. The wheel 48 is preferably comprised of plastic and is sized and shaped to fit snuggly within the internal track 16 of the case 18 as seen in FIGS. 8*a* and 8*b*. Here, the internal track 16 comprises a rough surface 58 disposed along its entire length. Similarly, the wheel 48 comprises a corresponding rough wheel surface 60 around its outer circumference which makes contact with the internal track 16. When turned by the axle 50, the rough wheel surface 60 of the wheel 48 generates friction and traction with the rough surface 58 of the internal track 16 and the wheel 48 then begins to move down the internal track 16 towards the opposing end of the electronic apparatus 20. With a wheel 48 disposed at both ends of the guide member 26, the entirety of the cleaner bar 10 traverses the surface of the electronic apparatus 20, cleaning the surface via the wiper member 22 as discussed above. A microcontroller 62 coupled to the electric motor 52 allows the electric motor 52 to drive the one or more wheels 48 for a predetermined amount of time that is sufficiently long enough for the cleaner bar 10 to traverse the longitudinal length of the screen surface 14 of the electronic apparatus 20. After traversing the electronic apparatus 20 for the predetermined amount of time, the electric motor 52 turns off and movement of the cleaner bar 10 is stopped. If the user desires to make an additional pass of the electronic apparatus 20 with the wiper member 22 or perhaps provide a drying stroke to the freshly cleaned surface 14 as discussed above, the user depresses the power button 56 again and the electric motor 52 drives the one or more wheels 48 in the opposite direction. The resulting action then moves the cleaner bar 10 back up the surface 14 of the electronic apparatus 20 in the direction opposite in which it came. The microcontroller 62 comprises means such as a ROM or RAM chip that records the direction in which the electric motor 52 last drove the one or more wheels 48, and thus the cleaner bar 10 as a whole, was last driven in. This ensures therefore that every time the power button 56 is pushed by the user the cleaner bar 10 moves in the opposing direction in which it last came. It is therefore one aspect of the present embodiment that the cleaner bar 10 may be stopped mid-way down the surface 14 of the electronic apparatus 20 and reversed into the opposite direction by pressing the power button 56 before the cleaner bar 10 has completed its initial pass over the electronic apparatus 20. In another embodiment, the microcontroller 62 and electric motor 52 coordinate to provide both a cleaning stroke and a drying stroke to the screen surface 14 after only pressing the power button 56 once, namely the cleaner bar 10 automatically returns to its starting position after reaching the longitudinal limit of the electronic apparatus 20.

Figure 9:
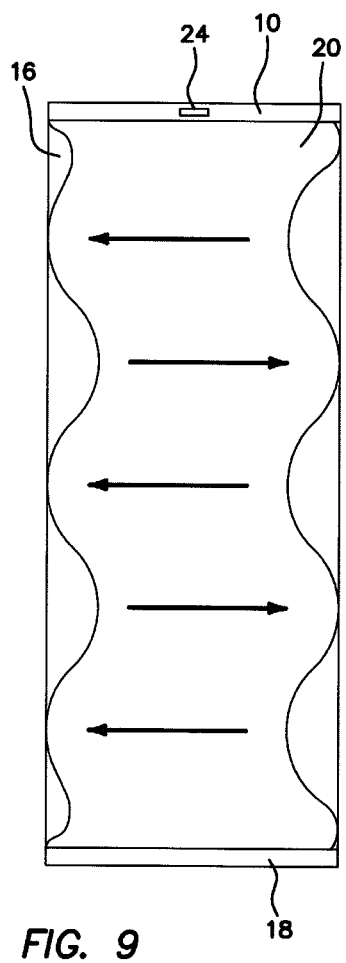
FIG. 9 is a top plan view of an alternative embodiment of the internal track defined within the case, the internal track comprising a curved surface to allow the wiper member of the cleaner bar a lateral movement as it applies a longitudinal cleaning or drying stroke.

In one embodiment, the internal track 16 within the case 18 comprises a curved or wave like shape as seen in FIG. 9. As the cleaner bar 10 traverses down the surface 14 of the electronic apparatus 20 from either manual or motorized means as discussed above, the guide member 26 of the cleaner bar 10 moves down through the curves of the internal track 16. Internal tracks 16 are disposed on either lateral side of the electronic apparatus 20 so as to provide complimentary shaped grooves that force the cleaner bar 10 to traverse the surface 14 of the electronic apparatus 20 in a lateral side-to-side motion in addition to the original longitudinal motion of the cleaner bar 10. The internal tracks 16 alternate in shaped peaks and valleys so as to provide sufficient space for the wiper member 22 of the cleaner bar 10 to move laterally across the surface 14 of the electronic apparatus 20.

Figure 10A:
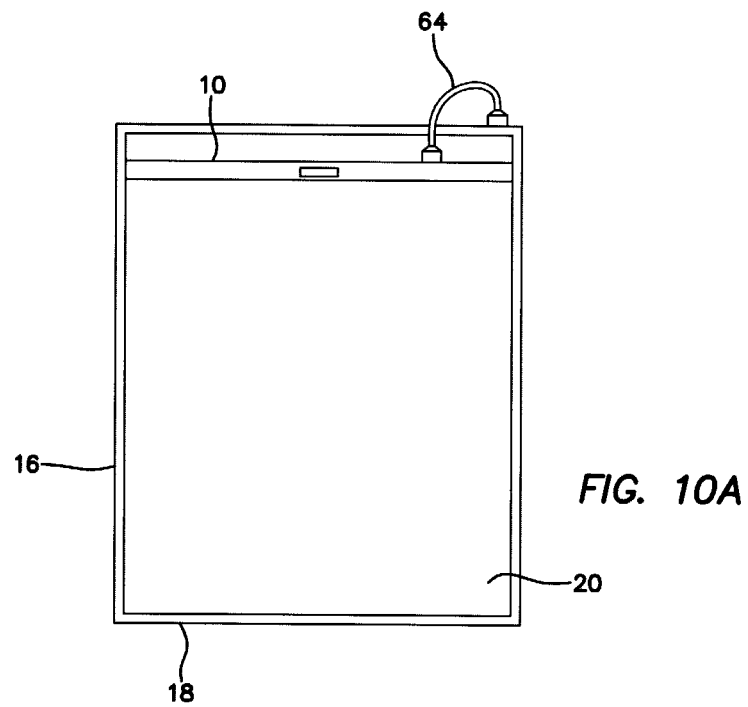
FIG. 10a is a top plan view of an alternative embodiment of the cleaner bar comprising a means for communicating with the electronic apparatus it is coupled to via a USB cable.
Figure 10B:
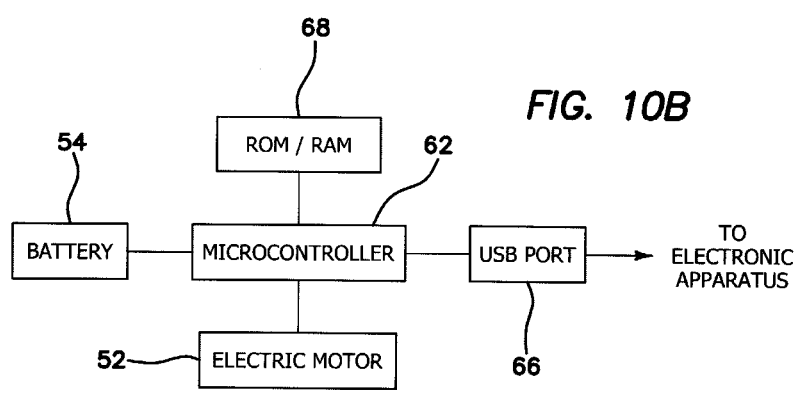
Figure 11:
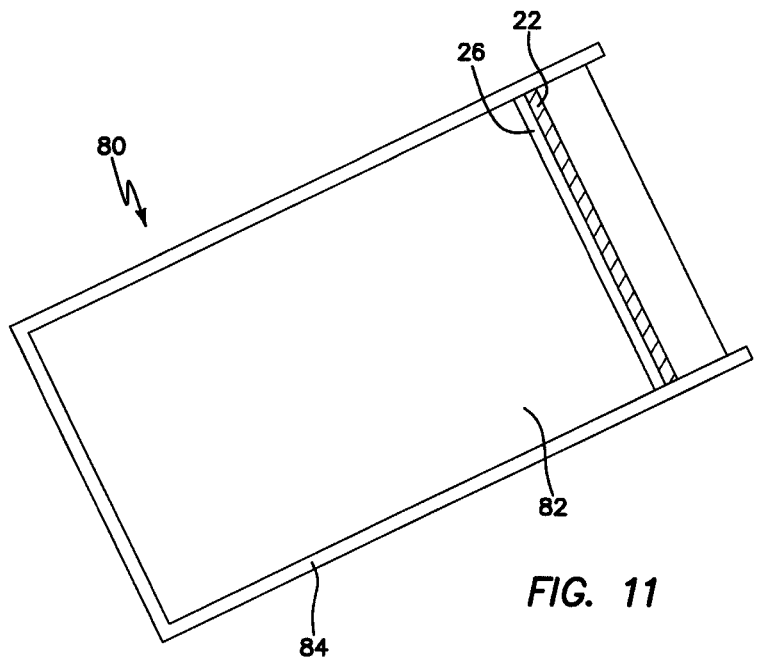
FIG. 11 is bottom plan view of a sheath comprising a guide member and wiper member disposed on its inner surface.

In another embodiment seen in FIGS. 10*a* and 10*b*, the guide member 26 of the cleaner bar 10 comprises a USB port 66 coupled to the microcontroller 62. The USB port 66 allows communication to and from the cleaner bar 10 to the electronic apparatus 20 it is coupled to via a standard USB cable 64. The USB cable 64 is sufficiently long enough so that communication is maintained between the cleaner bar 10 and the electronic apparatus 20 no matter the relative position of the cleaner bar 10 along the surface 14 of the electronic apparatus 20. A ROM and/or RAM memory chip 68 is also coupled to the microcontroller 62 which comprises a pre-programmed routine for interacting with the programming of the electronic apparatus 20. For example, a user in a doctor's office or other similar setting may use the electronic apparatus 20 to complete any number of tasks such as the filling out of medical forms as is frequently required. When the user has completed the task, it is submitted or the electronic apparatus 20 is otherwise notified the task has been carried out to completion. A corresponding signal is generated by the software in the electronic apparatus 20 as is commonly known and communicated to the cleaner bar 10 via the USB cable 64 and USB port 66. The microcontroller 62 receives the incoming signal and records the completion of the user task in the ROM/RAM chip 68. A signal is then generated by the microcontroller 62 and sent to the electric motor 52 to drive the one or more wheels 48. With the one or more wheels 48 in motion, the cleaner bar 10 traverses, down the surface of the screen 14 of the electronic apparatus 20 as discussed above, removing any fingerprints, dirt, or oils left behind by the latest user along the way. It is in this fashion therefore that every time a task is completed on the electronic apparatus 20, the cleaner bar 10 is automatically activated which cleans and/or disinfects the touch or display screen surface 14 of the electronic apparatus 20. This is an extremely beneficial feature in situations where the same electronic apparatus 20 is being used repeatedly by several different users such as in a doctor's office as the risk of transmitting infectious illnesses is minimized and overall cleanliness and good hygiene is promoted. The availability of a sanitizer reduces the chances of transmission of infectious agents as well as providing comfort to those concerned with health factors.

Figure 7A:
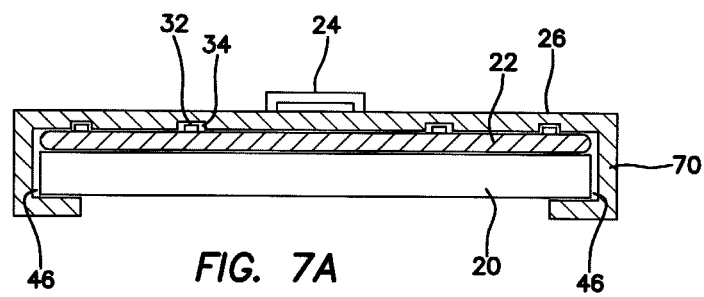
FIG. 7a is an end view of an alternative embodiment of the cleaner bar comprising a frame that is integrally coupled to the guide member.
Figure 7B:
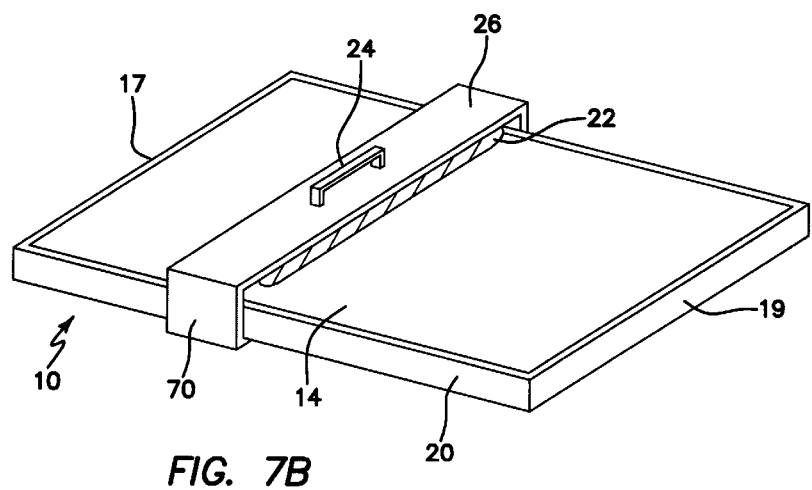
FIG. 7b is a perspective view of the embodiment of the cleaner bar seen in FIG. 7a with an electronic apparatus inserted within the frame of the cleaner bar.

The screen cleaner bar 10 and could be an integral part of the case 2 as seen in FIG. 1 for the electronic apparatus 20, or in an alternative embodiment shown in FIGS. 7*a* and 7*b*, may be a standalone component. For example, where the electronic apparatus 20 is a computer tablet, the cleaner bar 10 comprises a frame 70 that is integrally coupled to the guide member 26 as seen in FIG. 7*a*. The frame 70 comprises a pair of apertures 46 that are sufficiently sized and shaped to accommodate both the electronic apparatus 20 and the wiper member 22 of the cleaner bar 10 in a snug fit. The user first inserts the distal end 17 of the electronic apparatus 20 through the apertures 46 defined in the frame 70 and then begins to pull the cleaner bar 10 across the screen surface 14 using the handle 24. This action applies a cleaning stroke by the wiper member 22 as disclosed above and as is seen in FIG. 7b. When the cleaner bar 10 has reached the proximal end 19 of the electronic apparatus 20, the user may then reverse the direction of the cleaner bar 10 by pushing the handle 24 in the opposite direction and apply a drying stroke as disclosed above. Alternatively, the user may continue to pull the cleaner bar 10 off of the proximal end 19 of the electronic apparatus 20 and thus remove the cleaner bar 10 entirely from the electronic apparatus 20, letting any moisture or cleaning fluid deposited by the wiper member 22 to evaporate. The apertures 46 of the frame 70 help to keep the wiper member 22 centered over the electronic apparatus 20 as it is being pushed or pulled across the surface 14.

Figure 12:
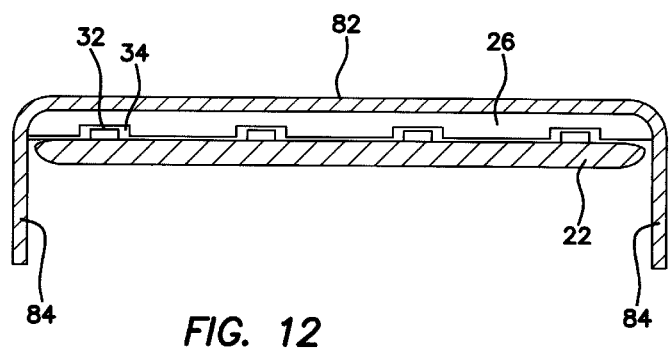
FIG. 12 is a longitudinal end view of the sheath seen in FIG. 11.
Figure 13A:
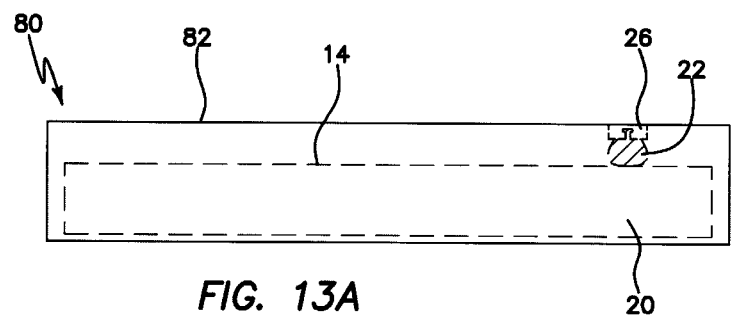
FIG. 13a is a side view of the sheath seen in FIG. 11 when the electronic apparatus denoted by the broken line drawing has been fully inserted within the sheath.
Figure 13B:
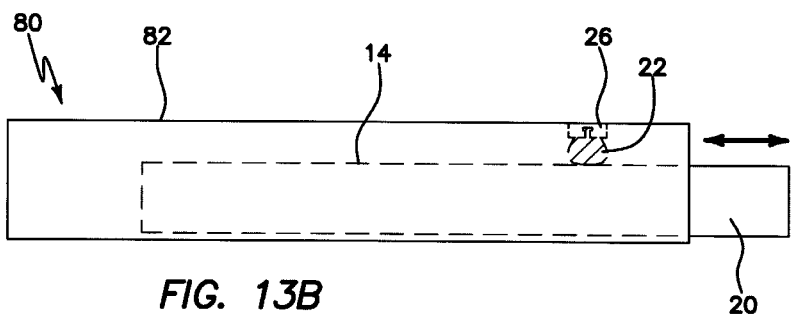
FIG. 13b is a side view of the sheath seen in FIG. 13a when the electronic apparatus is partially inserted within the sheath.

The guide member 26 of the device may also be permanently coupled to a sheath 80 as seen in FIGS. 11-13b. The sheath 80 is preferably comprised of light weight, durable plastic or plastic composite. The sheath 80 is molded into an elongated U-shape cross-section as best seen in FIG. 12 and is substantially rectangular in shape and is sufficiently sized to accommodate the entirety of the electronic apparatus 20. The sheath 80 is comprised of a shield portion 82 which extends down into a wall 84 along three of the four sides of the sheath 80, leaving one longitudinal end of the sheath 80 open for insertion and removal of the electronic apparatus 20. The guide member 26 is permanently coupled to the inner surface of the shield portion 82 as best seen in FIG. 12. The wiper member 22 is coupled to the guide member 26 as disclosed above. The wiper member 22 may comprise either a moist pad 22a, or a moist pad 22a and dry pad 22b combination as discussed in further detail above. As seen in FIG. 13b, the wiper portion 22 is disposed beneath the shield portion 82 far enough to make contact with the screen surface 14 of the electronic apparatus 20 as it is being slid distally into the sheath 80 between opposing sides of the wall 84. The wiper portion 22 continues to make contact with the longitudinal length of the screen surface 14 until the entirety of the electronic apparatus 20 is fully enclosed within the sheath 80 beneath the shield portion 82 as seen in FIG. 13a. The wiper portion 22 then applies a cleaning stroke every time the electronic apparatus 20 is inserted into the sheath 80. Any cleaning fluid deposited on the screen surface 14 by the wiper portion 22 is left to evaporate away. Once fully inserted, the sheath 80 provides an additional layer of protection from dirt and dust as well as provides a hard protective surface that prevents other outside objects or liquids from making detrimental contact with the screen surface 14 of the electronic apparatus 20. When the electronic apparatus 20 is removed from the sheath 80 by sliding it proximally out from between the walls 84, the wiper member 22 which is still in contact with the screen surface 14, applies a second cleaning stroke to the screen surface 14. Alternatively, the wiper member 22 may comprise a dry pad 22b as discussed above so as to apply a drying stroke to the screen surface 14 as the electronic apparatus 20 is being removed from the sheath 80.

Figure 14:
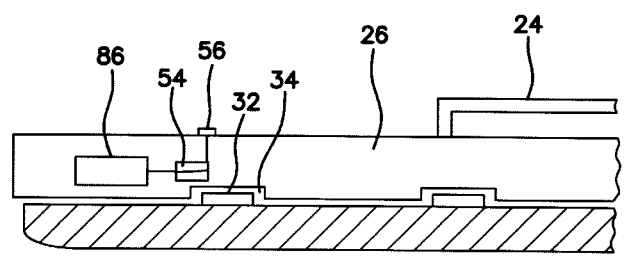
FIG. 14 is a magnified cross sectional view of an alternative embodiment of a portion of the cleaner bar comprising a vibrating motor disposed within the guide member of the cleaner bar.

In another embodiment seen in FIG. 14, the guide member 26 of the cleaner bar 10 comprises one or more mechanical or electromagnetic vibrating motors 86 commonly known in the art. The vibrating motor 86 is powered by a plurality of coin-type lithium batteries 54 and is selectively activated by a user actuating a power button 56 disposed on the top of the guide member 26. When the vibrating motor 86 is activated, it begins to oscillate which in turn oscillates the guide member 26 back and forth laterally across the screen surface 14. Because the male pegs 32 are free to move laterally but not longitudinally within the female apertures 34, the guide member 26 vibrates against the male pegs 32 causing them and the wiper member 22 as a whole to vibrate laterally across the screen surface 14. The wiper member 22 is continually vibrated laterally as it is moved longitudinally across the screen surface 14 in order to clean it more efficiently, namely by providing a "scrubbing" type motion as it moves across the screen surface 14.

In yet another embodiment seen in FIGS. 15-28, a cleaner frame 100 for cleaning the screen surface 14 is shown. The cleaner frame 100 comprises a drawbar 102, two lateral faces 104, and a gate 106. The cleaner frame 100 is sufficiently sized and shaped to accommodate and capture the entirety of the electronic apparatus 20 as seen as the broken line drawing within FIG. 1. Each lateral face 104 comprises an undulating plate, namely a right undulating plate 108(1) and a left undulating plate 108(2) coupled to its respective inside surface. Each undulating plate 108(1-2) is comprised of a series of periodic wave-like shapes that are out of phase with respect to one another, or in other words for example, when the right undulating plate 108(1) extends over the screen surface 14, the left undulating plate 108(2) coupled to the opposite lateral face 104 recedes from the screen surface 14. The drawbar 102 comprises a handle 110 coupled to its top surface that allows a user to pull and/or push the drawbar 102 across the screen surface 14 of the electronic apparatus 20 as demonstrated by the broken line positions of the drawbar 102 seen in FIG. 15.

Figure 15:
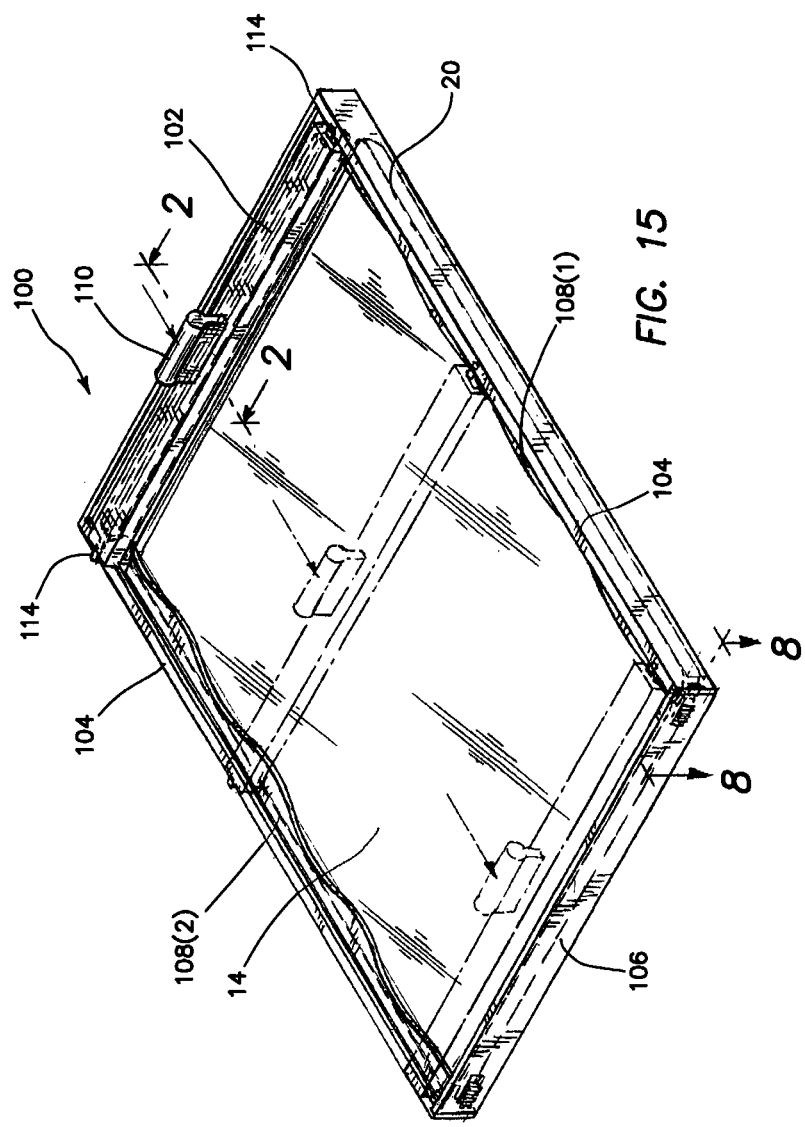
FIG. 15 is a perspective view of an alternative embodiment comprising a drawbar and squeegee beam.
Figure 16:
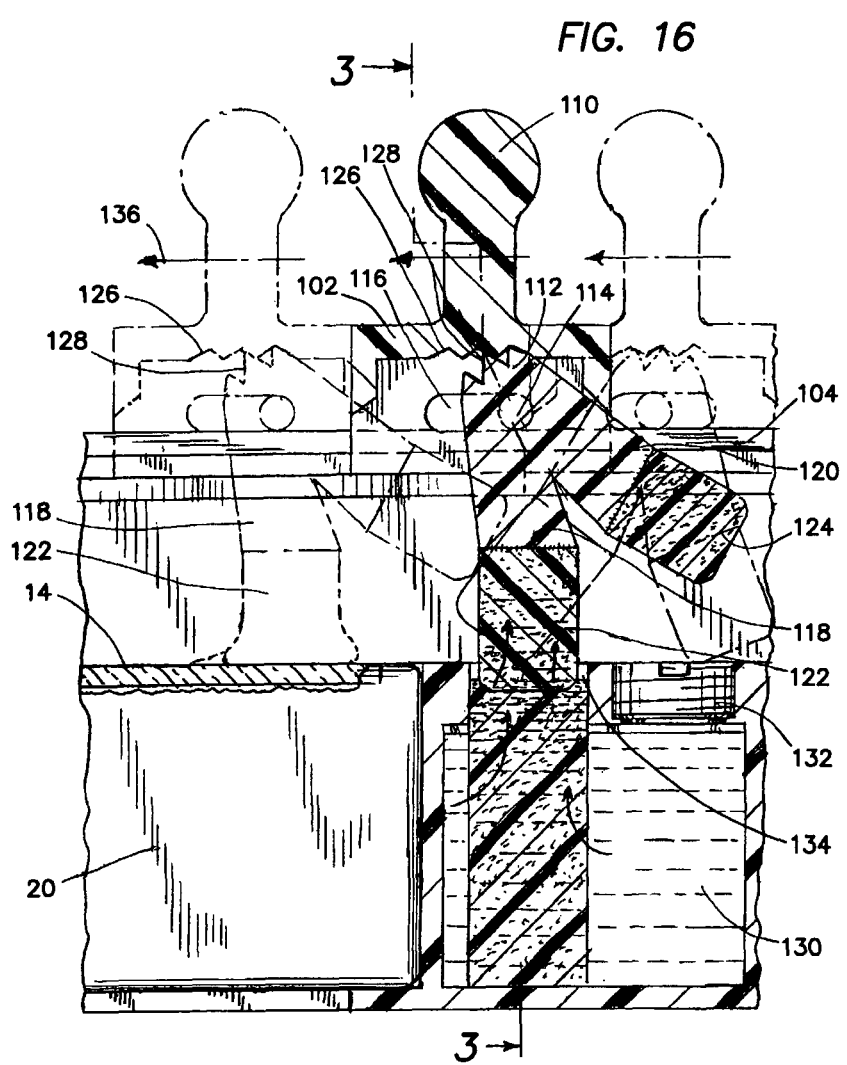
FIG. 16 is a cross sectional view taken through line 2-2 of the alternative embodiment seen in FIG. 15, the squeegee beam applying a wet sponge to the surface of the electronic apparatus.
Figure 17:
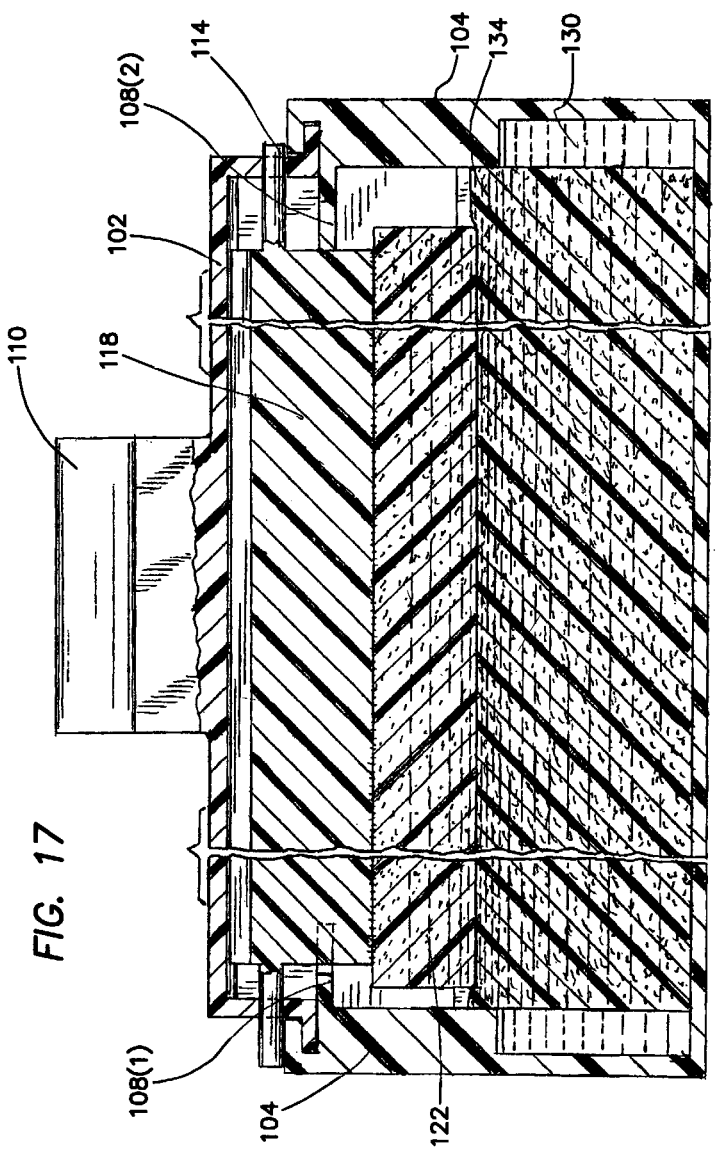
FIG. 17 is a cross sectional view taken through line 3-3 of the alternative embodiment seen in FIG. 16.
Figure 27:
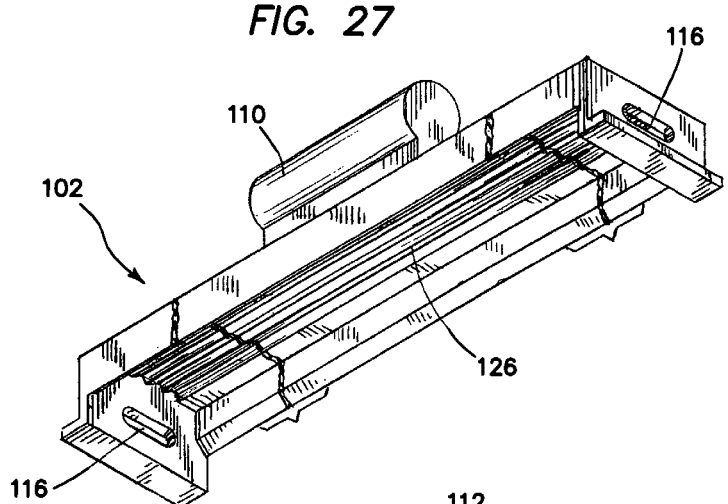
FIG. 27 is a bottom perspective view of the drawbar in the alternative embodiment.
Figure 28:
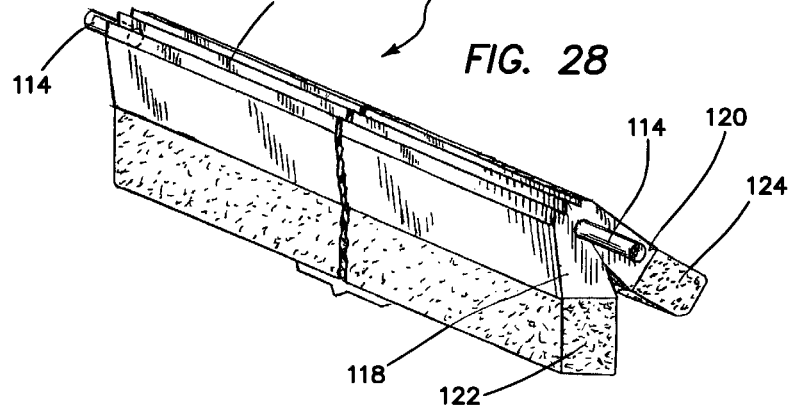
FIG. 28 is a perspective view of the squeegee beam in the alternative embodiment.

FIG. 16 is cross sectional view of the drawbar 102, lateral face 104, and the electronic apparatus 20 taken through the line 2-2 seen in FIG. 15. A squeegee beam 112 is coupled to the drawbar 102 via a pin 114 that is disposed through an aperture 116 defined within the drawbar 102. The squeegee beam 112 is disposed across the entire width of the electronic apparatus 20 and is in constant contact with the drawbar 102 via a plurality of handle teeth 126 and a plurality of beam teeth 128 defined within the drawbar 102 and squeegee beam 112 respectively as best seen in FIGS. 27 and 28. The squeegee beam 112 is also in constant contact with one of the two undulating plates, for example the right undulating plate 108(1) as seen in FIG. 17. The squeegee beam 112 comprises a pronged or forked structure comprising a cleaning arm 118 and a drying arm 120. Disposed at the distal end of the cleaning arm 118 and the drying arm 120 is a wet sponge 122 and a dry sponge 124, respectively.

Also seen in FIG. 16 is a reservoir 130 defined within the cleaner frame 100 adjacent to the electronic apparatus 20. The reservoir 130 is disposed across the entire width of the cleaner frame 100 as best seen in FIG. 17 and comprises an open trench 134 capable of interacting with the squeegee beam 112 as discussed in further detail below. Coupled to the reservoir 130 is a removable cap 132. When the reservoir is empty or in need refilling, the cap 132 is removed and water and/or cleaning fluid is poured into the reservoir 130 by means currently known in the art. Once filled, the cap 132 is replaced.

To clean the screen surface 14 of the electronic apparatus 20 using the cleaner frame 100, a user first grips the handle 110 of the drawbar 102 and pulls it in the direction of the arrow 136 seen in FIG. 16. As the drawbar 102 moves, the handle teeth 126 mesh and engage with the beam teeth 128, causing the pin 114 of the squeegee beam 112 to rotate within the aperture 116 of the drawbar 102, bringing the cleaning arm 118 into the open trench 134 of the reservoir 130. The wet sponge 122 disposed on the distal end of the cleaning arm 118 enters the open trench 134 and absorbs a portion of the water and/or cleaning fluid contained within the reservoir 130. As the drawbar 102 continues to move in the direction indicated by the arrow 136, the beam teeth 128 continually engage with the handle teeth 126 until the pin 114 comes into contact with the end of the aperture 116, locking the squeegee beam 112 into place as seen in the solid line drawing of FIGS. 16 and 17.

The drawbar 102 and locked squeegee beam 112 continue to move as a single fixed unit, bringing the wet sponge 122 out of the open trench 134 and on to the screen surface 14 of the electronic apparatus 20. As seen in the broken line drawing of FIG. 16, the wet sponge 122 deforms after contacting the screen surface 14 releasing the water and/or cleaning fluid contained therein onto the screen surface 14. The drawbar 102 is pulled in the direction of arrow 136 until reaching the gate 106 of the cleaning frame 100 as seen in FIG. 15.

Figure 18:
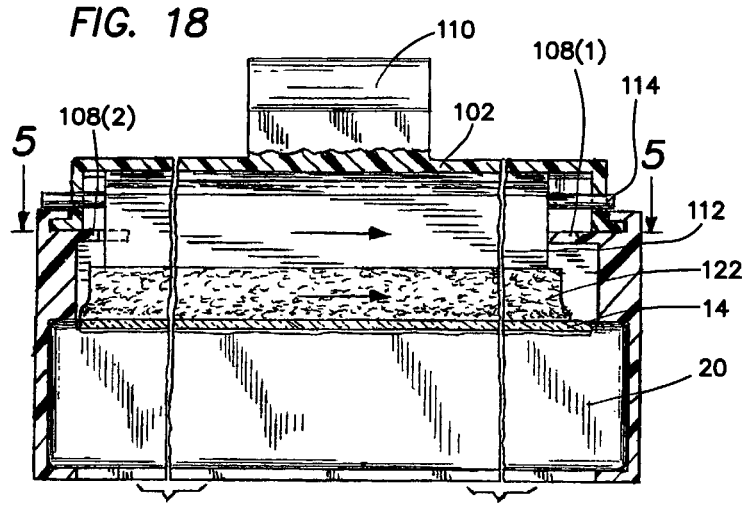
FIG. 18 is a cross sectional view taken through line 3-3 of the alternative embodiment seen in FIG. 16 when the squeegee beam is moving to the right due to the undulating plates.
Figure 20:
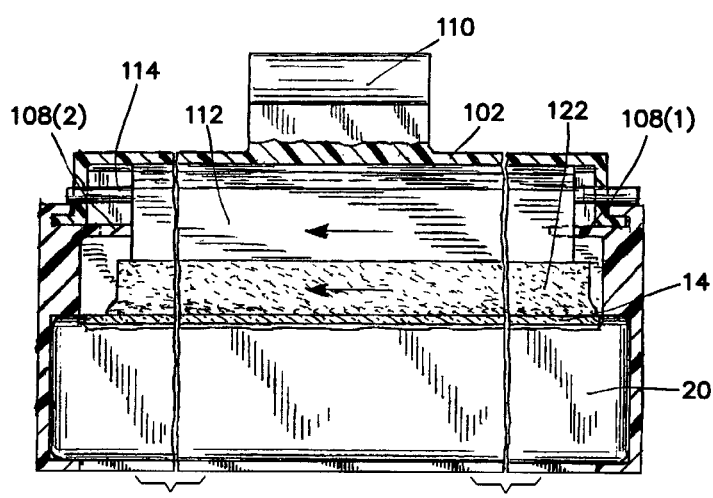
FIG. 20 is a cross sectional view taken through line 3-3 of the alternative embodiment seen in FIG. 16 when the squeegee beam is moving to the left due to the undulating plates.

During the traversal of the drawbar 102 and squeegee beam 112 down the screen surface 14, the squeegee beam 112 and thus the wet sponge 122 oscillate back and forth as seen in FIGS. 18-20 by alternating contact with the right undulating plate 108(1) and left undulating plate 108(2), thus applying a wiping motion to the screen surface 14 of the electronic apparatus 20. For example, as seen in FIG. 18, as the squeegee beam 112 is traversing the screen surface 14, the left undulating plate 108(2) makes contact with the squeegee beam 112, pushing it and the wet sponge 122 to the right of the cleaning frame 100. The squeegee beam 112 continues traversing the right portion of the screen surface 14 until the left undulating plate 108(2) recedes and the right undulating plate 108(1) advances which pushes the squeegee beam 112 and wet sponge 122 back in the opposing direction to the left of the cleaning frame 100 as seen in FIG. 20. This process of oscillating the squeegee beam 112 and wet sponge 122 back and forth via the left and right undulating plates 108(2), 108(1) as best seen in FIG. 19 repeats for as long as the drawbar 102 is pulled down the cleaning frame 100 or until the drawbar 102 comes to rest adjacent to the gate 106.

To dry the screen surface 14, the user reverses the direction of the drawbar 102 by pushing on the handle 110 back in the opposing direction towards the top of the cleaning frame 100. As the drawbar 102 moves in the direction of arrow 138 as seen in FIG. 21, the change in momentum causes the squeegee beam 112 to rotate within the drawbar 102 from the broken line position to the solid line position as shown. As the squeegee beam 112 rotates, the beam teeth 128 engage with the handle teeth 126 while the pin 114 contemporaneously slides into the left most position within the aperture 116, lifting the cleaning arm 118 off the screen surface 14 and bringing the drying arm 120 down towards the screen surface 14. The dry sponge 124 disposed at the distal end of the drying arm 120 makes contact with the screen surface 14. The drawbar 102 is pushed up the screen surface 14 as seen in FIG. 19 with the squeegee beam 112 and dry sponge 124 oscillating back and forth across the screen surface 14 via the left and right undulating plates 108(2), 108(1) as described above. As the dry sponge 124 traverses the screen surface 14, any excess moisture that was deposited by the wet sponge 122 is absorbed by the dry sponge 124, leaving the screen surface 14 of the electronic apparatus 20 substantially spot free.

The process of pulling and pushing the drawbar 102 may be repeated for as many times as necessary or until the screen surface 14 is deemed clean.

Figure 22:
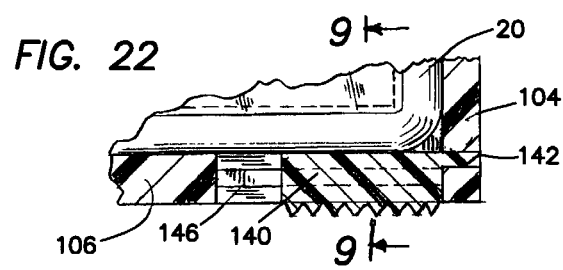
FIG. 22 is a cross sectional view taken through line 8-8 of the alternative embodiment seen in FIG. 15, with the gate locked.
Figure 23:
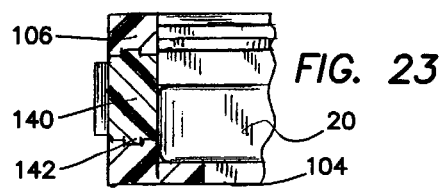
FIG. 23 is a cross sectional view taken through line 9-9 of the alternative embodiment seen in FIG. 22, with the gate locked.
Figure 24:
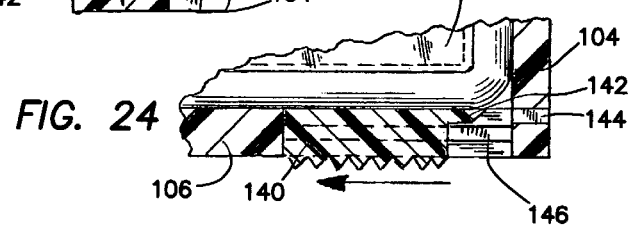
FIG. 24 is a cross sectional view taken through line 8-8 of the alternative embodiment seen in FIG. 15, with the gate unlocked.
Figure 25:
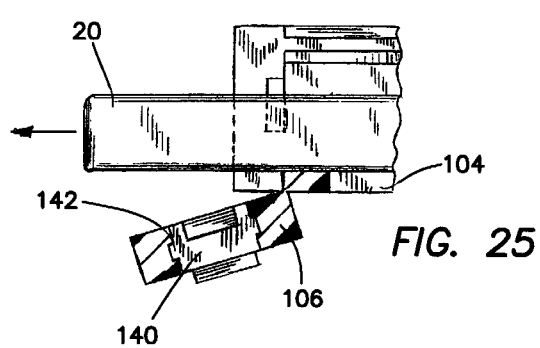
FIG. 25 is a cross sectional view taken through line 9-9 of the alternative embodiment seen in FIG. 22, with the gate unlocked and the electronic apparatus being removed.
Figure 26:
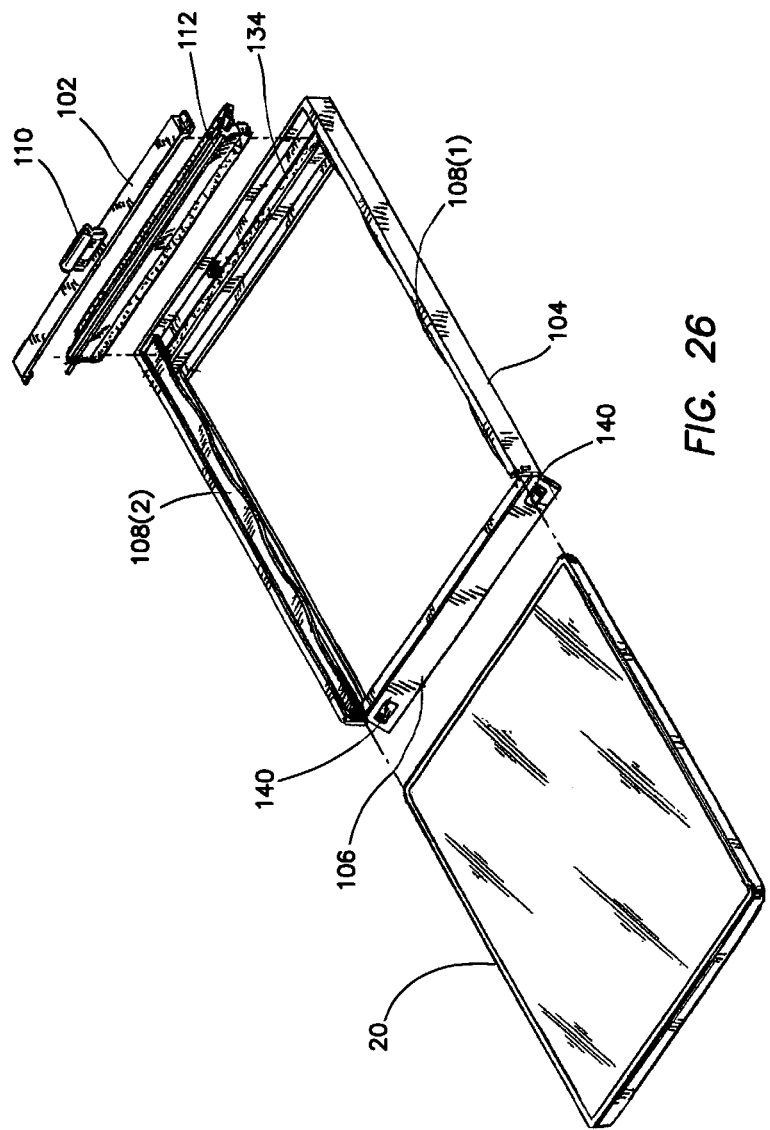
FIG. 26 is an exploded view of the alternative embodiment seen in FIG. 15.

The electronic apparatus 20 may be inserted into and removed from the cleaning frame 100 via the gate 106 as demonstrated in FIGS. 22-26. FIG. 22 is a magnified view of a bottom corner of the cleaner frame 100, specifically where the gate 106 meets a lateral face 104. The gate 106 comprises two latches 140 which are coupled to a latch track 146 defined within the gate 106. The latch 140 comprises a notch 142 which is inserted into the lateral face 104 as seen in FIG. 22. The notch 142 extends into the lateral face 104 in two dimensions as seen in the cross section of FIG. 23 to give the latch 140 added strength and stability. To remove the electronic apparatus 20 from the cleaner frame 100, each latch 140 is slid away from its respective lateral face 104 along the latch track 146 in the direction of the arrow seen in FIG. 24. As the latch 140 is slid away, the notch 142 exits the lateral face 104 leaving a notch aperture 144 defined within the lateral face 104 empty. With both latches 140 maneuvered away from each lateral face 104, the gate 106 is no longer coupled to the lateral faces 104 and is allowed to rotate downwards, out of the path of the electronic apparatus 20 as seen in FIG. 25. The electronic apparatus 20 is then proximally slid out of the cleaner frame 100 in the direction indicated by the arrow and may be removed entirely from the frame 100 as seen in FIG. 26. To insert the electronic apparatus 20 into the frame 100, the apparatus 20 is slid distally into the frame 100 and the gate 106 is rotated back up to the lateral faces 104 so as to block the path of the apparatus 20. Each latch 140 is then slid through the latch track 146 towards each respective lateral face 104 until the notch 142 is inserted into each notch aperture 144, locking the gate 106 to the lateral faces 104 and confining the electronic apparatus 20 within the frame 100.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An apparatus for cleaning a touch or display surface of an electronic device comprising:
    a case disposed around an outer circumference of the electronic device, the case having at least two opposing edges;
    a track defined on or within at least one of the at least two opposing edges of the case; and
    a movable cleaner bar disposed across at least a portion of the touch or display surface of the electronic device and coupled to the track of the at least two opposing edges of the case,
    wherein the cleaner bar includes a wiper in contact with the touch or display surface and wherein the track defined within or on at least one of the at least two opposing edges of the case comprises a track which is curved or waved shaped along its length.

2. The apparatus of claim 1 where the wiper comprises a moist pad and a dry pad both of which are coupled to the cleaner bar, and wherein the moist pad and dry pad are shaped to permit only the moist pad to contact the touch or display surface as the cleaner bar is moved in a first direction, and to permit only the dry pad to contact the touch or display surface as the cleaner bar is being moved in a second direction opposite to that of the first direction.

3. The apparatus of claim 1 where the wiper is coupled to the cleaner bar by means of a plurality of male pegs disposed on the wiper that are inserted into a corresponding plurality of female apertures defined in the cleaner bar, and wherein the female apertures are sized to prevent any movement of the male pegs in one direction but allow free movement of the male pegs in a direction orthogonal to the one direction.

4. The apparatus of claim 1 further comprising: a microcontroller; a battery coupled to the microcontroller; at least one electric motor coupled to the microcontroller; at least one axle coupled to the electric motor; and at least one wheel coupled to the distal end of the axle, wherein the at least one wheel is disposed within the at least one track defined within or on an opposing edge of the case.

5. The apparatus of claim 4 where the electric motor comprises means for driving the at least one wheel in both a clockwise and counterclockwise direction.

6. The apparatus of claim 4 further comprising a universal serial bus (USB) port and a non-volatile memory chip electrically coupled to the microcontroller.

7. The apparatus of claim 6 where the non-volatile memory chip includes a software routine comprising means for detecting when a task has been completed on the electronic device and where the microcontroller comprises means for activating the electric motor after detection of the completed task on the electronic device.

8. The apparatus of claim 1 further comprising a reservoir defined within the cleaner bar that is fluidically communicated to the wiper in contact with the touch or display surface.

9. The apparatus of claim 1 further comprising a nozzle disposed on an outside surface of the cleaner bar and a reservoir defined within the cleaner bar fluidically communicated to the nozzle.

10. The apparatus of claim 9 where the cleaner bar is comprised of resilient, deformable material.

11. The apparatus of claim 1 further comprising at least one vibrating motor disposed within the cleaner bar.

* * * * *